(12) United States Patent
Willard et al.

(10) Patent No.: US 7,896,422 B2
(45) Date of Patent: Mar. 1, 2011

(54) CONVERTIBLE TOP WITH SKYLIGHT

(75) Inventors: Michael T. Willard, Harrison Township, MI (US); Robert E. Fallis, III, Rochester, MI (US); Jan Just, Bloomfield Hills, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 145 days.

(21) Appl. No.: 12/402,967

(22) Filed: Mar. 12, 2009

(65) Prior Publication Data
US 2010/0230998 A1 Sep. 16, 2010

(51) Int. Cl.
*B60J 7/12* (2006.01)
*B60R 21/13* (2006.01)

(52) U.S. Cl. .............. 296/107.09; 296/107.03; 296/107.07; 296/187.13; 280/756

(58) Field of Classification Search ........... 296/107.01, 296/107.07, 216.01, 187.13, 107.03, 107.09; 280/756
See application file for complete search history.

(56) References Cited

U.S. PATENT DOCUMENTS

| | | | | |
|---|---|---|---|---|
| 3,174,794 A * | 3/1965 | Moynihan, Jr. | ............. | 296/219 |
| 3,508,785 A | 4/1970 | Chang | | |
| 4,371,204 A * | 2/1983 | George et al. | ............... | 296/218 |
| 5,056,816 A * | 10/1991 | Lutze et al. | ................. | 280/751 |
| 5,236,219 A * | 8/1993 | Jambor et al. | ............... | 280/756 |
| 5,626,361 A | 5/1997 | Heiner | | |
| 6,033,012 A * | 3/2000 | Russke et al. | ............... | 296/219 |
| 6,270,143 B1 * | 8/2001 | Heselhaus et al. | ...... | 296/107.01 |
| 6,511,095 B1 * | 1/2003 | Kober et al. | ................ | 280/756 |
| 6,572,145 B1 * | 6/2003 | Guillez et al. | ............... | 280/756 |
| 6,578,898 B2 * | 6/2003 | Rothe et al. | ............ | 296/107.07 |
| 6,902,190 B2 | 6/2005 | Nass | | |
| 6,988,744 B2 | 1/2006 | Muller | | |
| 7,114,769 B2 * | 10/2006 | Storc et al. | ................... | 296/219 |
| 7,175,199 B2 * | 2/2007 | Muller | ...................... | 280/756 |
| 7,384,067 B2 * | 6/2008 | Parks et al. | ................. | 280/756 |
| 7,478,874 B2 * | 1/2009 | Figenser et al. | ........ | 297/216.13 |
| 7,481,458 B2 * | 1/2009 | Bunsmann et al. | ......... | 280/756 |
| 7,500,709 B2 * | 3/2009 | Heselhaus | ............. | 296/107.07 |
| 7,543,878 B2 * | 6/2009 | Lang | ........................ | 296/68.1 |
| 7,690,684 B2 * | 4/2010 | Tobaru et al. | ............... | 280/756 |
| 7,703,827 B2 * | 4/2010 | Bunsmann et al. | ............ | 296/56 |
| 7,717,461 B2 * | 5/2010 | Beierl et al. | ................ | 280/756 |
| 7,740,277 B2 * | 6/2010 | Schmitt | ..................... | 280/756 |
| 7,744,125 B2 * | 6/2010 | Tang | ......................... | 280/756 |
| 2004/0130136 A1 | 7/2004 | Muller | | |
| 2005/0280291 A1 * | 12/2005 | Storc et al. | .................. | 296/219 |
| 2006/0097499 A1 * | 5/2006 | Welch | ........................ | 280/756 |
| 2006/0131862 A1 * | 6/2006 | Hermann et al. | ........... | 280/756 |
| 2008/0309126 A1 * | 12/2008 | Beierl et al. | ........... | 296/216.01 |
| 2010/0133799 A1 * | 6/2010 | Gaertner et al. | ............. | 280/756 |

* cited by examiner

*Primary Examiner*—Glenn Dayoan
*Assistant Examiner*—Gregory Blankenship
(74) *Attorney, Agent, or Firm*—Brooks Kushman P.C.

(57) ABSTRACT

A convertible top for a vehicle that is provided with a dynamic roll bar or dynamic occupant head protection system. The convertible top has a skylight that is retained in a skylight opening formed in the flexible cover of the convertible top. The skylight may be supported on one of the bows of the convertible top or may be supported on a skylight linkage that cooperates with the top stack linkage. In the event that a need for the roll bar is sensed by the vehicle resulting in the actuation of the roll bar assembly, the roll bar assembly may break the skylight in the course of deployment to assure fully deployment of the roll bar assembly.

13 Claims, 8 Drawing Sheets

CONVERTIBLE TOP WITH SKYLIGHT

BACKGROUND OF THE INVENTION

1. Field of the Invention

The present invention relates to a convertible top for a vehicle in which a flexible fabric cover is supported by a top stack linkage wherein the convertible top includes a skylight.

2. Background Art

Soft-top convertibles generally include a fabric cover that is supported by a top stack linkage. Conventional convertible tops include a rear light, or window, that is attached to the fabric cover between a four bow and a five bow of the top stack. In a five bow top, the four and five bow are the two rearmost bows of the convertible top with the five bow being disposed at the belt line of the vehicle and the four bow being disposed at the roof line of the vehicle.

Convertible vehicles have been developed that include pop-up roll bar assemblies that are intended to protect passengers in the event of a collision. Pop-up roll bar assemblies may include pyrotechnic or spring-actuated extension mechanisms that are used to instantaneously raise the roll bar assemblies. The roll bar assemblies in their raised position combine with the windshield header to support the body of the vehicle and protect passengers in event the vehicle rolls over. The pop-up roll bars generally must be fully extended to lock in their deployed position. Pop-up roll bars are intended to operate whether the convertible top is in its extended or retracted position. If the convertible top is extended, the flexible fabric may prevent the pop-up roll bars from fully extending and locking in place. If the convertible top prevents the pop-up roll bars from locking in their deployed position, the roll bars may not properly function.

There is a need for a convertible top having a soft cover that does not interfere with the operation of pop-up roll bars and which provides improved aesthetics in a durable and robust convertible top.

These and other problems will be addressed by Applicants' invention as summarized below.

SUMMARY OF THE INVENTION

The present invention relates to a convertible top that covers a passenger compartment of a vehicle. The convertible top includes a flexible cover that has a generally vertical rear portion defining a back light opening and a generally horizontal roof top portion that defines a rear skylight opening. The rear skylight opening is located in front of and above the back light opening in a rear half of the roof top portion. A back light is assembled to the back light opening and a skylight is assembled to the rear skylight opening. An articulated top stack linkage is provided that supports the cover in an extended position in which the passenger compartment is covered by the cover and in a retracted position in which the cover is retracted to a storage location behind the passenger compartment.

Alternatively, the present invention relates to a convertible top for a vehicle having a passenger compartment that the convertible top covers when extended. The convertible top has a retracted position in which the convertible top is stored behind the passenger compartment. The vehicle has a vertically extendable roll bar assembly that is extended in a linear direction from a ready position behind the passenger seat to an actuated position in which the roll bar assembly extends above the convertible top when the convertible top is in its extended position. The convertible top comprises a top stack linkage having a header attachment bow that is attached to the windshield header of the vehicle and a plurality of bows that extend parallel to the header attachment bow and are disposed above the passenger compartment. The convertible top has a design position in which the bows disposed over the passenger compartment provide head room above the passenger compartment. The rearmost bow of the convertible top is disposed at a back peripheral portion of the convertible top and typically rests upon the belt line of the vehicle. A fabric cover is secured to and extends from the header attachment bow rearwardly to the rearmost bow. The fabric cover defines a skylight opening that is aligned with the roll bar assembly so that the roll bar assembly moves through the skylight when the roll bar assembly is actuated. A skylight is disposed in the skylight opening and is supported on the top stack linkage when the roll bar assembly is in the ready position. The skylight is displaced from the skylight opening when the roll bar assembly is actuated.

According to other aspects of the present invention, the vehicle may have a dynamic occupant head protection mechanism, such as a pop-up roll bar, that is deployed from the vehicle to a location below the skylight to a position in which the occupant head protection mechanism extends above the skylight. The skylight may be a glass panel that is designed to break when the occupant head protection mechanism is deployed.

According to other aspects of the invention, a rearmost bow may be disposed on the rear deck of the vehicle with the next forwardly adjacent bow being disposed above the rearmost bow and on the opposite side of the back light from the rearmost, or five, bow. The skylight is disposed on the opposite side of the next forwardly adjacent bow from the back light. The first through the third bows may be provided in front of the four bow with the skylight being disposed between the third and fourth bow of the convertible top. A skylight may be fixedly attached to the four bow and may extend in the forward vehicle direction relative to the four bow when the top is in its extended position. The skylight, or a frame of the skylight, may be assembled to the four bow and the top stack linkage. The skylight may be assembled to a skylight linkage that is connected to the top stack linkage. The skylight linkage cooperates with the top stack linkage as the cover is moved between the extended and retracted positions. The skylight linkage holds the skylight in the skylight opening when the cover is in the extended position.

These and other aspects of the present invention will be better understood in view of the attached drawings and following detailed description of the illustrated embodiment.

DETAILED DESCRIPTION OF THE PREFERRED EMBODIMENT(S)

Figure 1:
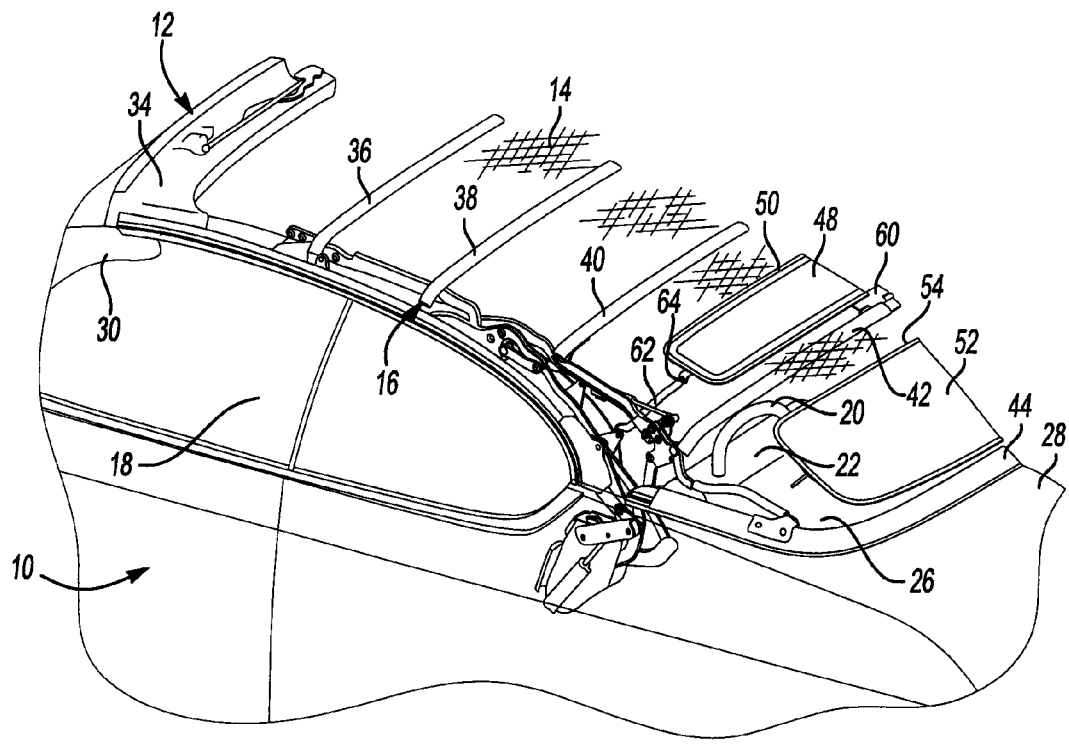
FIG. 1 is a fragmentary rear perspective view of a vehicle having a convertible top including a skylight disposed over an active roll bar assembly.

Referring to FIG. 1, a vehicle 10 is shown that includes a convertible top 12. The convertible top 12 has a flexible cover 14 that is partially shown in FIG. 1. The flexible cover 14 is supported by a top stack linkage 16 when the convertible top 12 is in an extended position covering a passenger compartment 18 of the vehicle 10. The vehicle 10 is provided with a dynamic roll bar assembly 20 that is automatically raised in the event of a vehicle collision that is determined by sensors to be of sufficient severity or of the type that could result in the vehicle rolling over onto its roof. The dynamic roll bar assembly 20 may be actuated in a collision event regardless of whether the top is in its extended or retracted position. The roll bar assembly 20 is located behind the rear seat which is shown diagrammatically in FIG. 1. The top is stored in a storage compartment 26 located behind the rear seat 22 when in its retracted position. The storage compartment 26 is generally located behind the rear seat 22 and in front of the rear decklid 28 that is used to cover the trunk of the vehicle 10.

The convertible top 12 extends from a windshield header 30 to the rear decklid 28 when it is in its extended position. A header attachment bow 34 is secured to the windshield header 30 when the top 12 is in its extended position. Behind the header attachment bow 34, a plurality of bows are provided. The number of bows may range from three to six bows, not including the header attachment bow 34 as one of the bows. The number of bows may vary depending upon the size of the convertible top. In the illustrated embodiment, the bows are identified as one bow 36, two bow 38, three bow 40, four bow 42 and five bow 44.

A skylight 48 is provided in a skylight opening 50 formed in the flexible cover 14. The skylight 48 is located between three bow 40 and the four bow 42. The skylight 48 is located above the roll bar assembly 20 and as shown in FIG. 1, the roll bar 20 is shown extending through the skylight 48. In event the roll bar 20 is actuated, the roll bar 20 is driven through the skylight if the convertible top 12 is in its extended position. The force of the impact of the roll bar assembly 20 will cause the skylight 48 to break, or break free, from the skylight opening 50. The skylight 48 is disposed in the path of motion of the roll bar assembly 20 and is oriented generally perpendicular to the path of motion so that the skylight 48 will break instead of restricting the roll bar assembly 20 from moving to its actuated or deployed position.

A rear light 52 is provided in a rear light opening 54. The rear light 52 in the illustrated embodiment is secured to the flexible cover 14 between the four bow 42 and five bow 44.

A hinge 60, or bracket, may be secured to the skylight 48 by welding, fasteners, or adhesives. The hinge 60 extends between the skylight 48 and the four bow 42. A side link 62 is attached by a pivot bracket 64 to the skylight 48 and to the top stack linkage 16.

Figure 2:
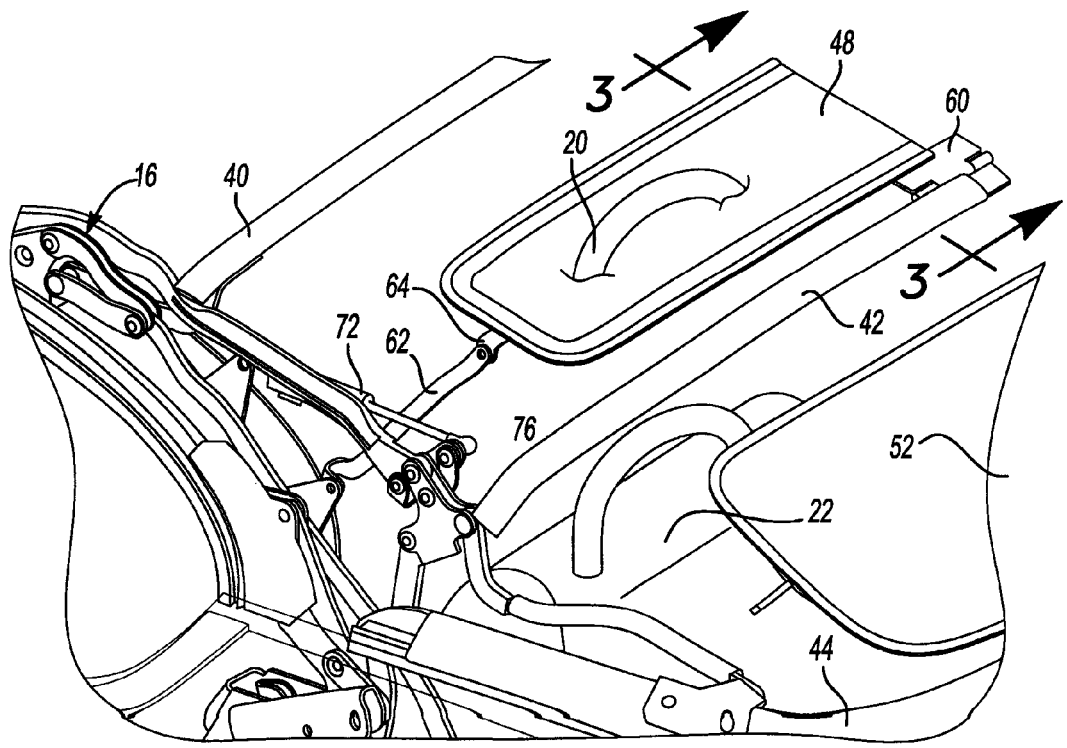
FIG. 2 is an enlarged portion of the convertible top as illustrated in FIG. 1.

Referring to FIG. 2, the skylight 48 is shown with the roll bar assembly 20 extending through the skylight as would be the case in the event that the roll bar assembly 20 is actuated. The skylight 48 is between the three bow 40 and four bow 42. The skylight 48 is located on the opposite side of the four bow 42 from the back light 52. The back light 52 is shown located between the four bow 42 and five bow 44. Also shown in FIG. 2 is the storage compartment 26 and the rear seat 22.

Figure 3:
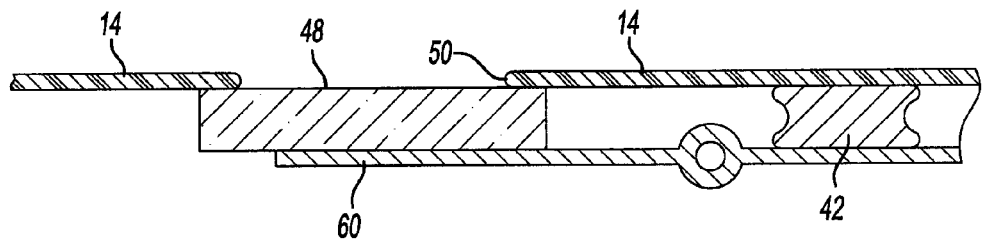
FIG. 3 is a cross-sectional view taken along the line 3-3 in FIG. 2.

Referring to FIG. 3, the skylight 48 is shown secured to a skylight opening 50 formed in the flexible cover 14. The hinge 60 is shown connected to the skylight 48 and the four bow 42.

Figure 4:
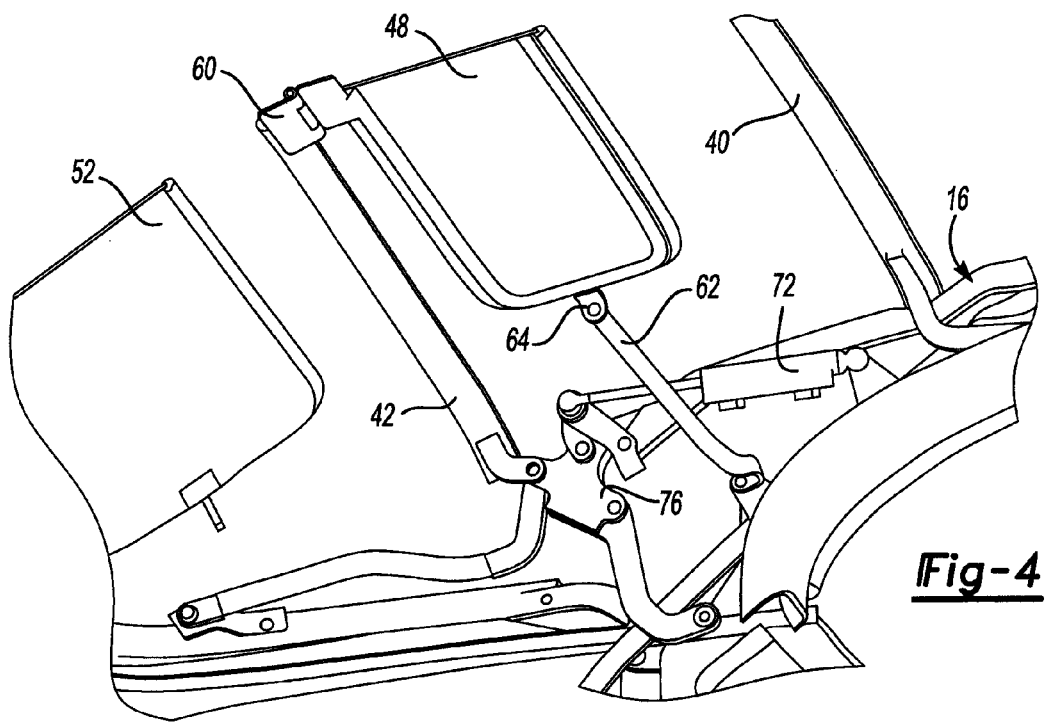
FIG. 4 is a fragmentary inside perspective view of a convertible top that is provided with a skylight attached to one of the bows and the top stack linkage, in the extended position.
Figure 5:
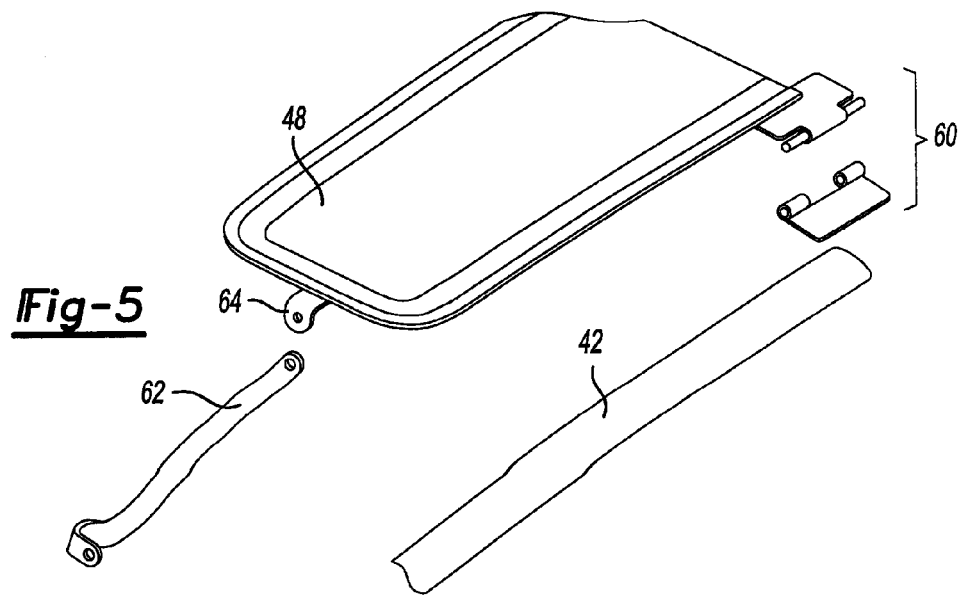
FIG. 5 is an enlarged perspective view of a skylight, links attaching the skylight to a bow and the tap stack linkage.

Referring to FIGS. 4 and 5, the skylight 48 is shown as it is connected to the four bow 42 by the hinge 60. A pivot bracket 64 is provided on opposite lateral sides of the skylight 48. The pivot bracket 64 is connected to a side link 62 that extends from the pivot bracket 64 to the top stack linkage 16. As the top folds, the side link 62 acts on the skylight 48 through the pivot bracket 64 to cause the skylight 48 to pivot on the hinge 60 relative to the four bow 42.

Figure 6:
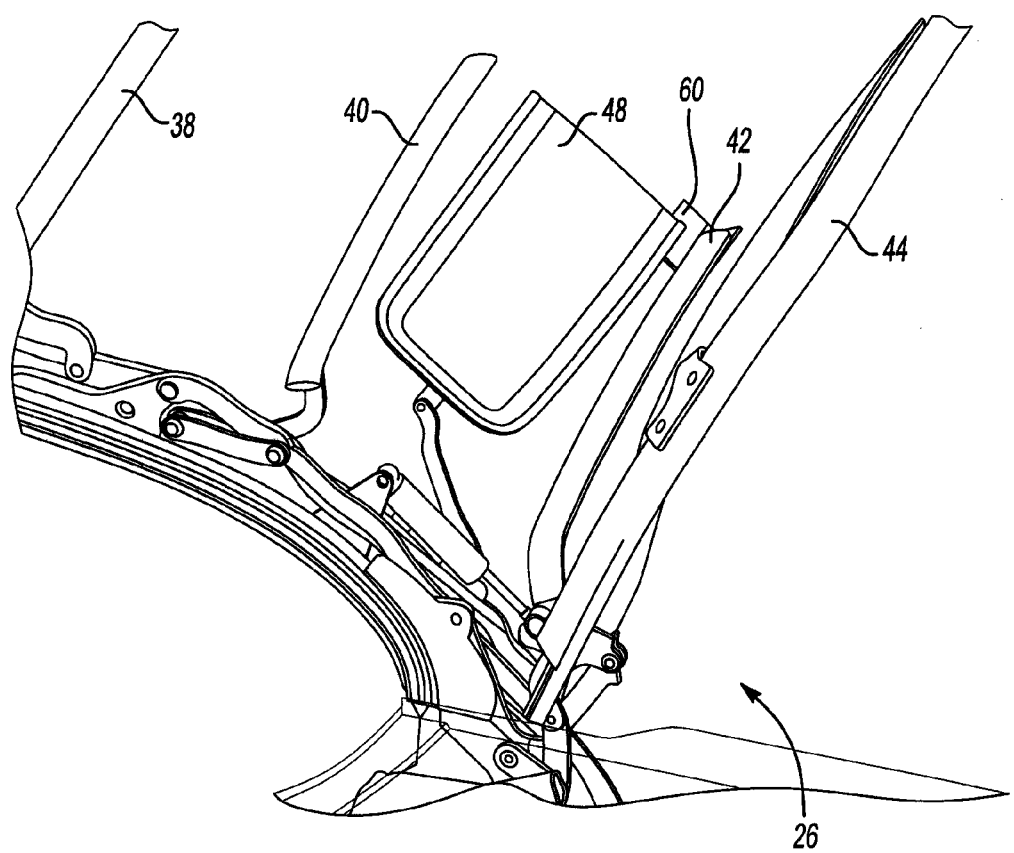
FIG. 6 is a fragmentary outside perspective view showing the convertible top as illustrated in FIG. 1.

Referring to FIG. 6, the convertible top is shown in its partially retracted position. In this position, the five bow 44 is lifted to allow the other parts of the convertible top 12 to be folded together to be stored in the storage compartment 26 below the five bow 44. The four bow 42 is tipped downwardly and towards the skylight.

Figure 7:
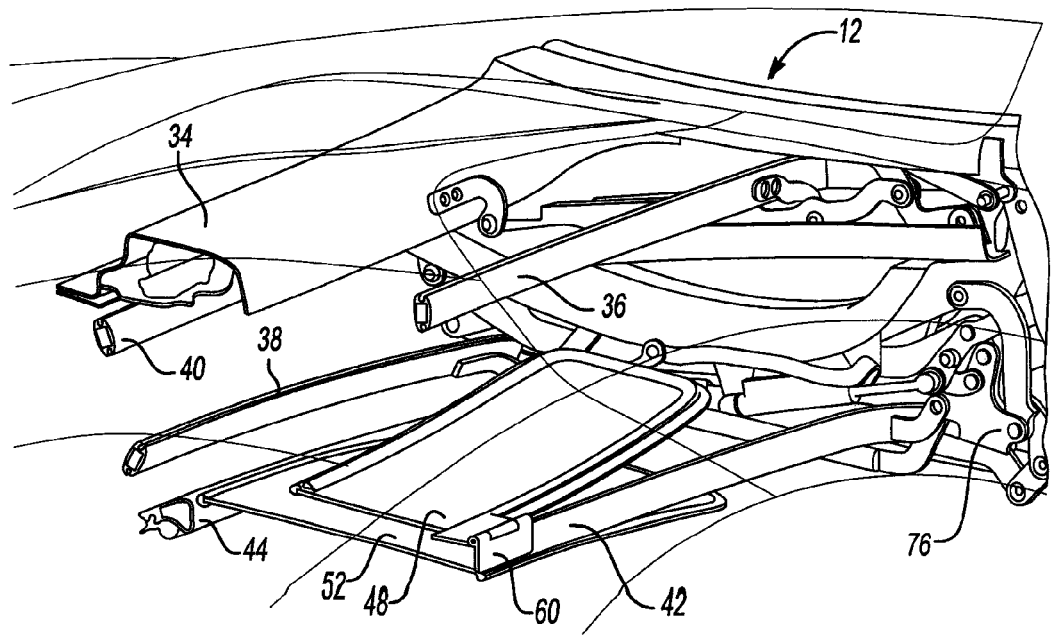
FIG. 7 is a fragmentary perspective view of a convertible top as illustrated in FIG. 1 that has a skylight supported on a skylight linkage in its retracted position.

Referring to FIG. 7, the convertible top 12 is shown in its fully retracted position. The four bow 42 is shown supporting the hinge 60 and skylight 48 in an inverted orientation and overlying the rear light 52 in the storage compartment. The five bow 44 is located in the bottom of the storage area with the header attachment bow 34, one bow 36 and two bow 38 being folded over the back part of the roof that contains the rear light 52 and the skylight 48.

Figure 8:
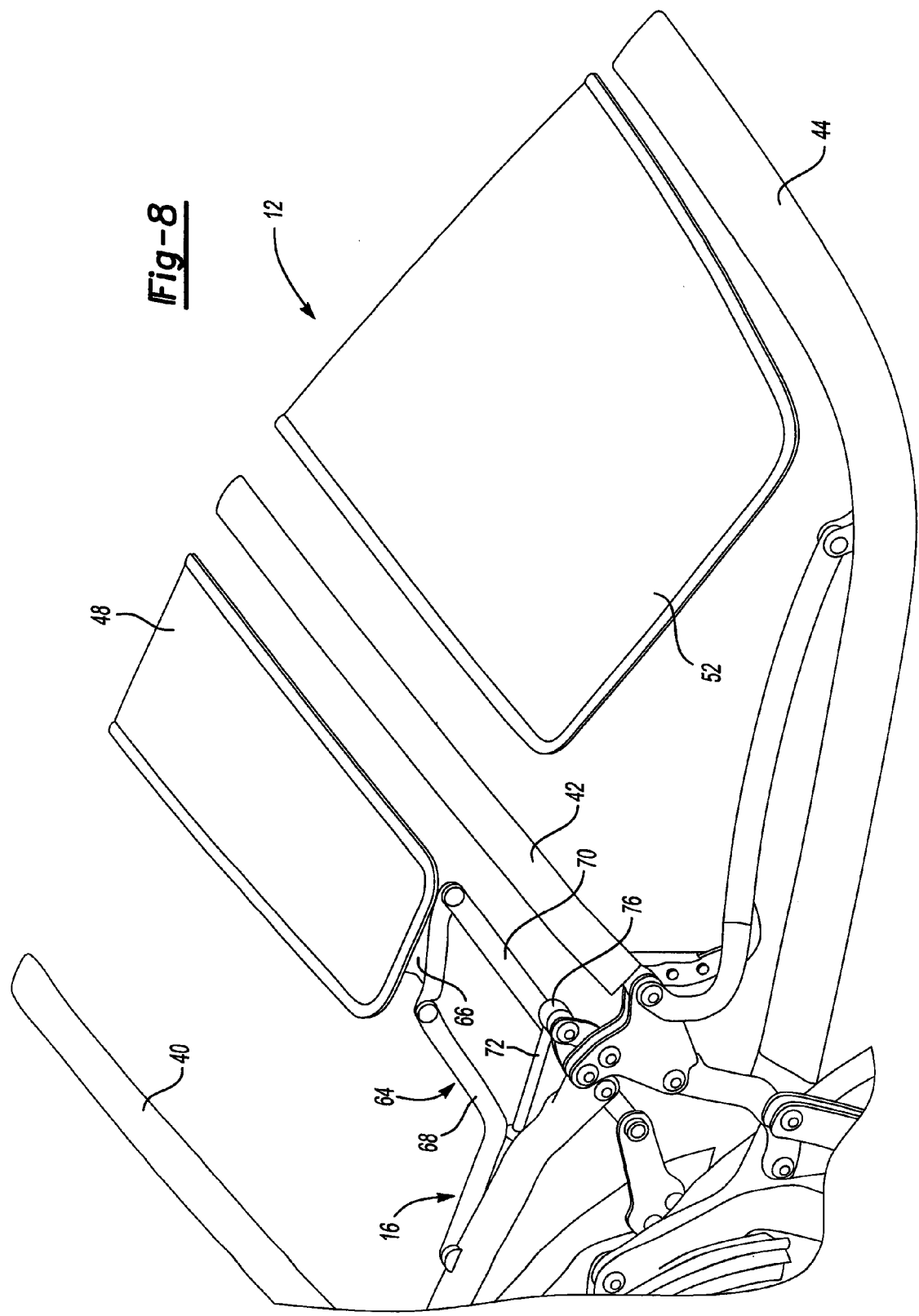
FIG. 8 is a fragmentary outside perspective view showing an alternative embodiment of the convertible top in which the skylight is connected by a linkage to the top stack linkage and is not directly connected to any of the bows of the top.

Referring to FIG. 8, an alternative embodiment of the convertible top is shown. For brevity, the elements of the convertible top 12 that are substantially the same in each of the illustrated embodiments will be referred to by the same reference numerals. In the embodiment of FIG. 8, the skylight 48 is again disposed between the three bow 40 and the four bow 42. The skylight 48 is on the opposite side of the four bow 42 from the rear light 52. The rear light 52 is located between the four bow 42 and the five bow 44. A flexible cover (not shown in FIG. 5) extends from the five bow 44 to the header attachment bow 34. The convertible top is raised and lowered on the top stack linkage 16. As the top stack linkage 16 is extended and retracted, a skylight linkage 64 cooperates with the top stack linkage 16 to hold the skylight 48 in the desired orientation to facilitate folding the top 12. The skylight linkage 64 holds the skylight in registry with the flexible cover 14 (not shown). The skylight linkage 64 includes an end flange 66 on opposite lateral sides of the skylight 48. Each end flange 66 is supported on its front edge on a front support bar 68 and on its rear edge on a rear support bar 70. A power cylinder 72, for example a hydraulic cylinder, is connected between the top stack linkage 16 and skylight linkage 64 by means of a pivot bracket 76 that is pivotally mounted on the top stack linkage 16 between three bow 40 and four bow 42.

Figure 9:
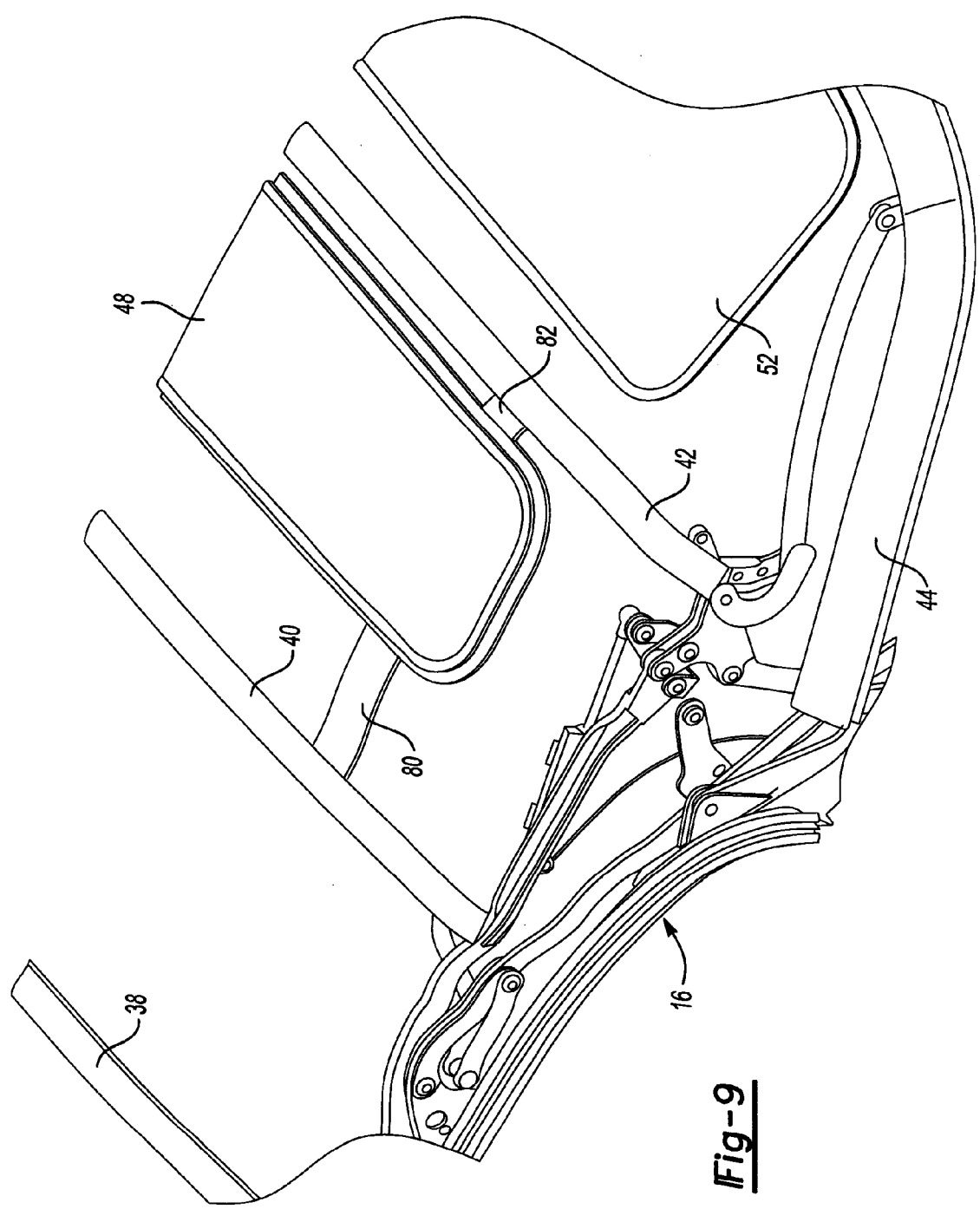
FIG. 9 is a fragmentary outside perspective view showing an alternative embodiment of the convertible top that is directly connected to two bows of the top by supporting flanges.
Figure 10:
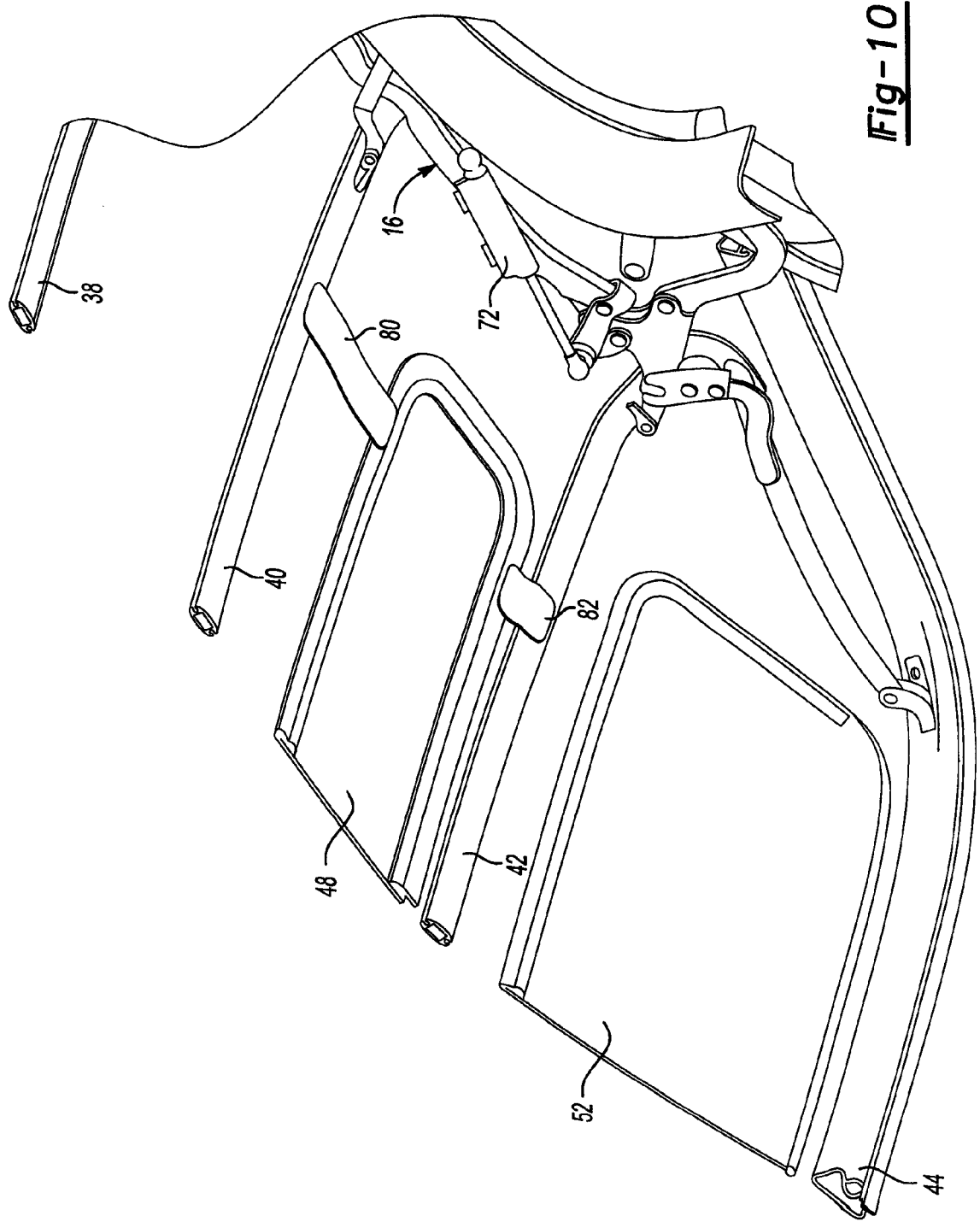
FIG. 10 is a fragmentary inside perspective view of the convertible top shown in FIG. 9.

Referring to FIGS. 9 and 10, another alternative embodiment of the convertible top 12 is shown in which the skylight 48 is tied to the four bow and three bow by means of elongated rigid straps. A front strap 80 extends from the three bow 40 to the skylight 48 and supports the front edge of the skylight 48.

A rear strap 82 secures the rear edge of the skylight to the four bow 42. The straps 80, 82 are preferably rigid metal straps that hold the skylight 48 rigidly within the flexible cover (not shown in FIG. 9) so that in the event the roll bar assembly 20 is actuated, the skylight 48 is held securely until the skylight either breaks free or breaks apart so as to not interfere with deployment of the roll bar 20 assembly 20. A set of front and rear straps 80, 82 are provided at spaced locations with at least two sets of straps 80, 82 being provided on right and left sides of the vehicle.

Figure 11:
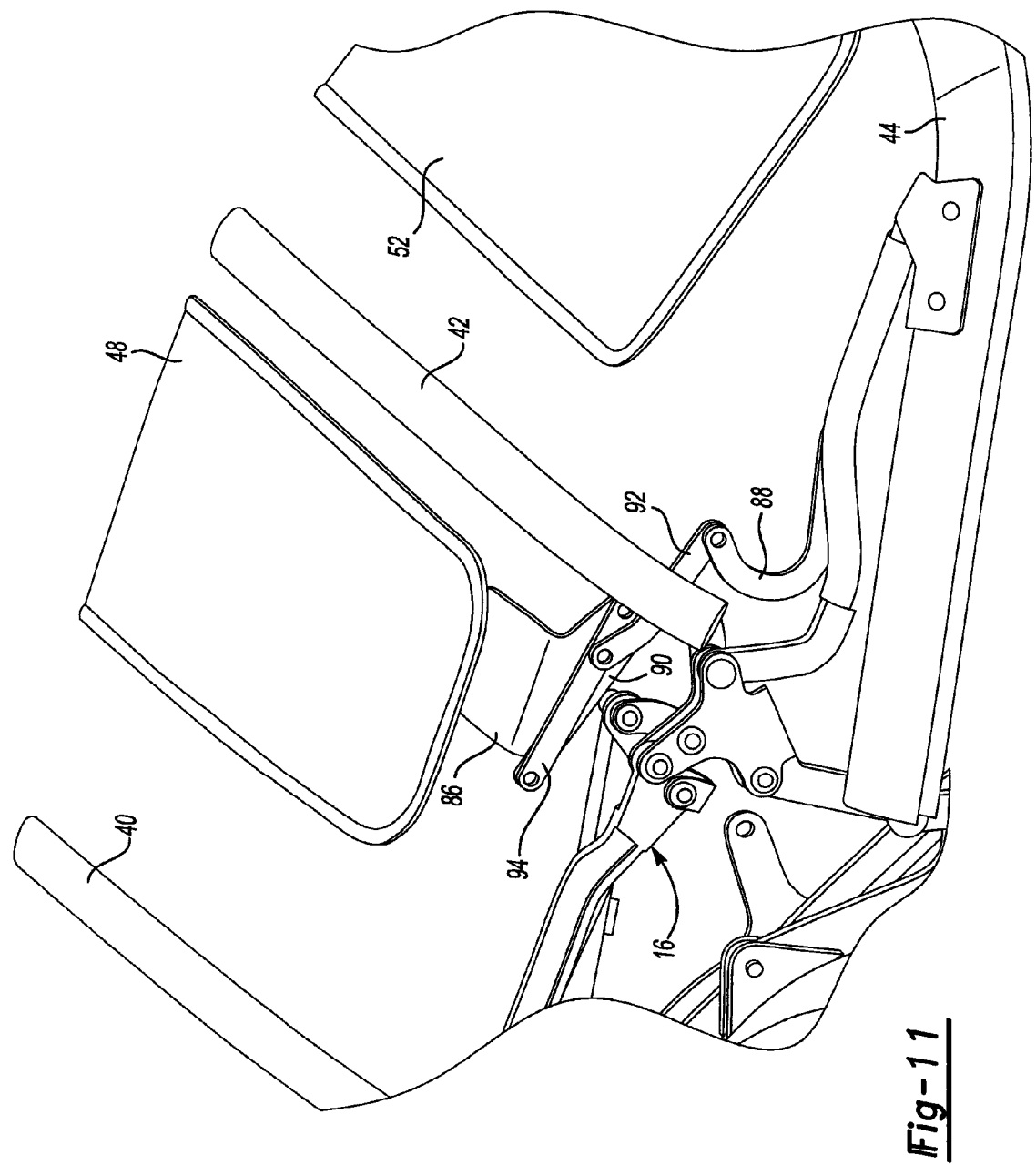
FIG. 11 is a fragmentary outside perspective view of another alternative embodiment of the convertible top in which the skylight is secured to a linkage that is connected to both the top stack linkage and the four bow.
Figure 12:
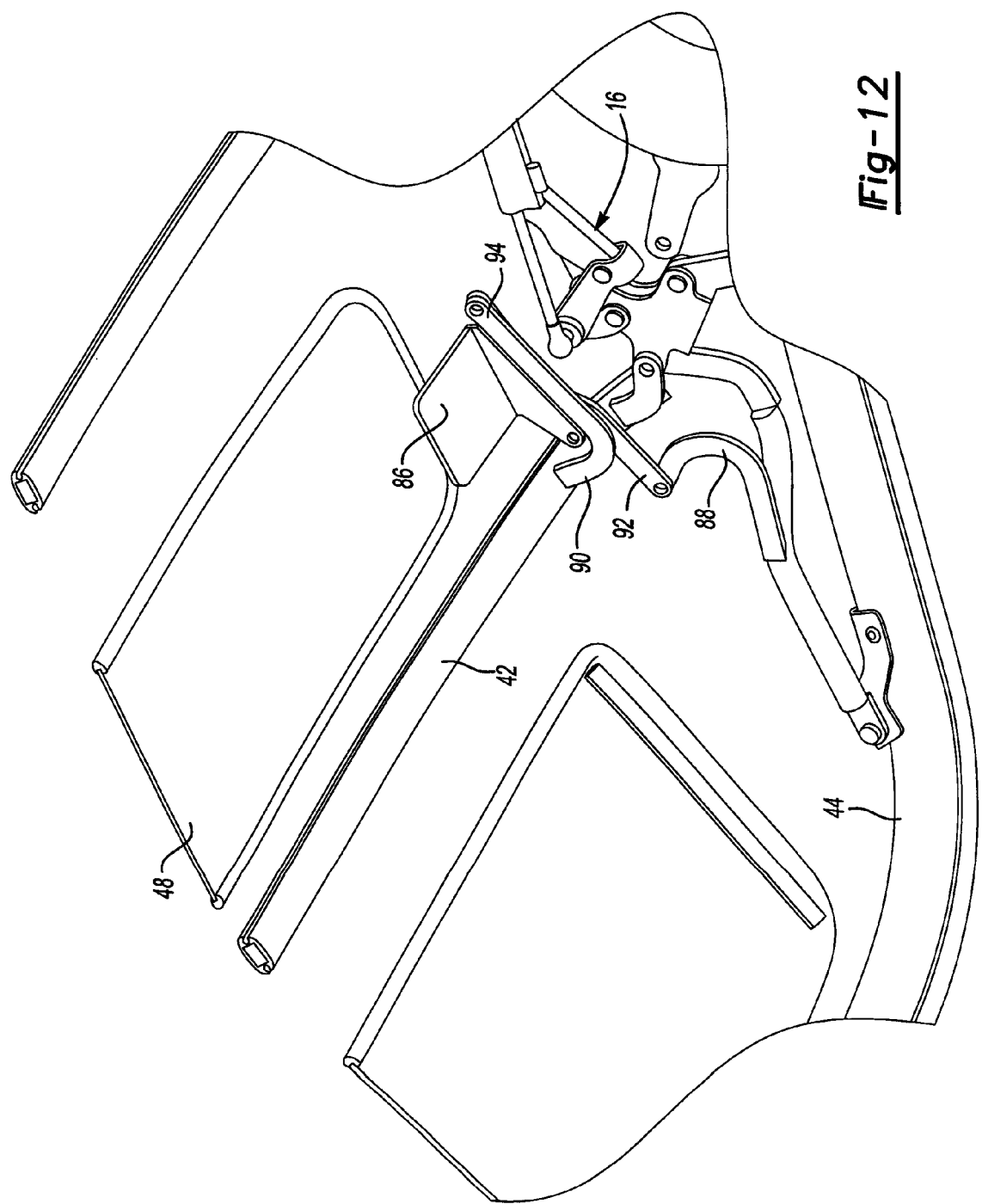
FIG. 12 is a fragmentary inside perspective view of the embodiment of the convertible top shown in FIG. 11.

Referring to FIGS. 11 and 12, another alternative embodiment is shown in which the skylight 48 is connected to the linkage 16 and in particular to the portion of the top stack linkage that is connected to the four bow 42 and the five bow 44. A side bracket 86 is secured to the side of the skylight 48 on both sides right and left of the skylight 48. A hook link 88 is connected indirectly to the five bow 44. The side bracket 86 is connected to the four bow by means of an L-shaped link 90. An intermediate link 92 is connected on opposite ends to the hook link 88 and a straight link 94. The straight link 94 is connected on one end to the L link 90 and on the opposite end it is connected to the side bracket 86. In this embodiment, movement of the skylight 48 is coordinated with movement of the four bow 42 and the five bow 44.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top for a vehicle having a passenger compartment and a dynamic occupant head protection mechanism that is deployed from the vehicle, comprising:
    a flexible cover having a generally vertical rear portion defining a back light opening and a generally horizontal roof top portion defining a rear sky light opening, the rear sky light opening being located in front of and above the back light opening in a rear half of the roof top portion;
    a back light assembled to the back light opening;
    a skylight assembled to the rear skylight opening, wherein the dynamic occupant head protection mechanism is disposed at a location below the skylight and that is moved to a position in which the occupant head protection mechanism extends above the skylight, wherein the skylight is a glass panel, and wherein deployment of the occupant head protection mechanism breaks or displaces the skylight; and
    an articulated top stack linkage that supports the cover in an extended position in which the passenger compartment is covered by the cover and in a retracted position in which the cover is retracted to a storage location behind the passenger compartment.

2. The convertible top of claim 1 wherein top stack linkage includes five bows that are disposed at spaced intervals front-to-rear and extend transverse to the vehicle direction, wherein a five bow is disposed to lie upon a rear deck of the vehicle when the top is in the extended position, and a four bow is disposed above the five bow and on the opposite side of the back light from the five bow, wherein the skylight is disposed on the opposite side of the four bow from the back light.

3. The convertible top of claim 2 wherein a third bow is provided in front of the four bow and the skylight is disposed between the third bow and the fourth bow.

4. A convertible top for a vehicle having a passenger compartment, comprising:
    a flexible cover having a generally vertical rear portion defining a back light opening and a generally horizontal roof top portion defining a rear sky light opening, the rear sky light opening being located in front of and above the back light opening in a rear half of the roof top portion;
    a back light assembled to the back light opening;
    a skylight assembled to the rear skylight opening; and
    an articulated top stack linkage that supports the cover in an extended position in which the passenger compartment is covered by the cover and in a retracted position in which the cover is retracted to a storage location behind the passenger compartment, wherein top stack linkage includes a plurality of bows that are disposed at spaced intervals front-to-rear and extend transverse to the vehicle direction, wherein a first bow is disposed to lie upon a rear deck of the vehicle when the top is in the extended position, and a second bow is disposed above the first bow and on the opposite side of the back light from the first bow, wherein the skylight is disposed on the opposite side of the second bow from the backlight, wherein the skylight is fixedly attached to the second bow and extends in the forward vehicle direction relative to the second bow when the top is in the extended position.

5. The convertible top of claim 4 wherein the second bow defines a slot that is integrally formed as part of the second bow in an extrusion operation, wherein the skylight is assembled to the slot in the second bow.

6. A convertible top for a vehicle having a passenger compartment, comprising:
    a flexible cover having a generally vertical rear portion defining a back light opening and a generally horizontal roof top portion defining a rear sky light opening, the rear sky light opening being located in front of and above the back light opening in a rear half of the roof top portion;
    a back light assembled to the back light opening;
    a skylight assembled to the rear skylight opening;
    an articulated top stack linkage that supports the cover in an extended position in which the passenger compartment is covered by the cover and in a retracted position in which the cover is retracted to a storage location behind the passenger compartment; and
    wherein the skylight is assembled to a skylight linkage that is connected to the top stack linkage and cooperates with the top stack linkage as the cover is moved between the extended and retracted positions, wherein the skylight linkage holds the skylight in the skylight opening when the cover is in the extended position.

7. A convertible top for a vehicle having a passenger compartment, wherein the convertible top covers the passenger compartment in an extended position and has a retracted position in which the convertible top is stored behind the passenger compartment, the vehicle having a vertically extendable roll bar assembly that is extended in a linear direction from a ready position behind a passenger seat to an actuated position in which the roll bar assembly extends above the convertible top in the extended position, the convertible top comprising:
    a top stack linkage that has an attachment bow that is attached to a windshield header of the vehicle, a one bow, a two bow, a three bow, and a four bow extending parallel to the one bow and being disposed above the passenger compartment in a design position for the convertible top in the extended position in which clearance is provided above the passenger compartment, and wherein a five bow disposed at a back peripheral portion of the convertible top and which is disposed at a belt line of the vehicle;

a fabric cover secured to the top stack linkage and extending from the windshield header rearwardly to the five bow, the fabric cover defining a skylight opening that is aligned with the roll bar assembly so that the roll bar assembly moves through the skylight when the roll bar assembly moves to the actuated position; and a skylight disposed in the skylight opening and being supported on the top stack linkage when the roll bar assembly is in the ready position, wherein the skylight is displaced from the skylight opening when the roll bar assembly is in the actuated position.

8. The convertible top of claim 7 wherein the vehicle has the roll bar assembly is deployed from the vehicle at a location below the skylight to a position in which the occupant head protection mechanism extends above the skylight, wherein the skylight is a glass panel, and wherein deployment of the roll bar assembly breaks the skylight.

9. The convertible top of claim 7 wherein the four bow is disposed above the five bow and on the opposite side of the back light from the five bow, wherein the skylight is disposed on the opposite side of the four bow from the back light.

10. The convertible top of claim 9 wherein a third bow is provided in front of the four bow and the skylight is disposed between the third bow and the fourth bow.

11. The convertible top of claim 9 wherein the skylight is fixedly attached to the four bow and extends in the forward vehicle direction relative to the four bow when the top is in the extended position.

12. The convertible top of claim 11 wherein the four bow defines a slot that is integrally formed as part of the four bow in an extrusion operation, wherein the slot receives the skylight when the roll bar assembly is in the ready position.

13. The convertible top of claim 7 wherein the skylight is assembled to a skylight linkage that is connected to the top stack linkage and cooperates with the top stack linkage as the cover is moved between the extended and retracted positions, wherein the skylight linkage holds the skylight in the skylight opening when the convertible top is in the extended position.

* * * * *